(12) United States Patent
Redler et al.

(10) Patent No.: US 12,038,516 B2
(45) Date of Patent: Jul. 16, 2024

(54) METHOD AND SYSTEM FOR REAL-TIME VEHICLE LOCATION AND IN-VEHICLE TRACKING DEVICE

(71) Applicant: CLOUD WISE LTD., Kfar Saba (IL)

(72) Inventors: Yesaiahu Redler, Kfar Saba (IL); Amir Lorber, Bnei Brak (IL)

(73) Assignee: CLOUD WISE LTD., Kfar Saba (IL)

( * ) Notice: Subject to any disclaimer, the term of this patent is extended or adjusted under 35 U.S.C. 154(b) by 333 days.

(21) Appl. No.: 17/180,850

(22) Filed: Feb. 21, 2021

(65) Prior Publication Data

US 2021/0173093 A1 Jun. 10, 2021

Related U.S. Application Data

(63) Continuation-in-part of application No. PCT/IL2019/050929, filed on Aug. 20, 2019.

(30) Foreign Application Priority Data

Aug. 20, 2018 (IL) .......................... 261237

(51) Int. Cl.
*G01S 19/00* (2010.01)
*G01C 21/30* (2006.01)
(Continued)

(52) U.S. Cl.
CPC ............ *G01S 19/393* (2019.08); *G01C 21/30* (2013.01); *G01S 19/34* (2013.01); *G01S 19/36* (2013.01);
(Continued)

(58) Field of Classification Search
CPC ........ G01S 19/393; G01S 19/34; G01S 19/36; G01S 19/45; G01S 19/47; H04W 4/48; H04W 4/029; H04W 4/027; G01C 21/30
(Continued)

(56) References Cited

U.S. PATENT DOCUMENTS 6,282,496 B1 8/2001 Chowdhary
2003/0191583 A1 10/2003 Uhlmann et al.
(Continued)

FOREIGN PATENT DOCUMENTS

CN 101586962 A 11/2009
CN 101936737 A 1/2011
(Continued)

OTHER PUBLICATIONS

PCT International Search Report for International Application No. PCT/IL2019/050929, dated Nov. 27, 2019, 9pp.
(Continued)

*Primary Examiner* — Tiffany P Young
(74) *Attorney, Agent, or Firm* — The Roy Gross Law Firm, LLC; Roy Gross

(57) ABSTRACT

A self-contained integrated portable vehicle tracking system that does not comprise any wired connection to any device or location external to the container unit is disclosed. The tracking system comprises a microcontroller unit (MCU); a GPS receiver in communication with said MCU; a GPS patch antenna connected to said MCU; a wireless transceiver in communication with said MCU; a power source comprising a solar cell; and a power management system. In addition, a method for determining the position of a moving vehicle with high accuracy is disclosed. Unlike methods known in the art, the method disclosed herein does not require the use of an inertial navigation system or continuous operation of a GPS. The method comprises determining the velocity of the moving object from a determination of its speed and angular velocity and correlating the signals obtained from the velocity sensors with a map data layer.

33 Claims, 6 Drawing Sheets

(51) Int. Cl.
| | |
|---|---|
| *G01S 19/34* | (2010.01) |
| *G01S 19/36* | (2010.01) |
| *G01S 19/39* | (2010.01) |
| *G01S 19/45* | (2010.01) |
| *G01S 19/47* | (2010.01) |
| *H04W 4/02* | (2018.01) |
| *H04W 4/029* | (2018.01) |
| *H04W 4/48* | (2018.01) |

(52) U.S. Cl.
CPC .............. *G01S 19/45* (2013.01); *G01S 19/47* (2013.01); *H04W 4/027* (2013.01); *H04W 4/029* (2018.02); *H04W 4/48* (2018.02)

(58) Field of Classification Search
USPC ........................................................ 701/445
See application file for complete search history.

(56) References Cited

U.S. PATENT DOCUMENTS

| | | |
|---|---|---|
| 2007/0213887 A1 | 9/2007 | Woodings |
| 2010/0332126 A1 | 12/2010 | Huang et al. |
| 2011/0257882 A1 | 10/2011 | McBurney et al. |
| 2013/0085666 A1 | 4/2013 | Zhang et al. |
| 2013/0226447 A1 | 8/2013 | Mizuno et al. |
| 2014/0372026 A1 | 12/2014 | Georgy et al. |
| 2016/0146616 A1 | 5/2016 | Ren |
| 2017/0069144 A1* | 3/2017 | Lawrie-Fussey .... G06Q 10/083 |
| 2017/0176586 A1* | 6/2017 | Johnson ................. G01C 17/38 |

FOREIGN PATENT DOCUMENTS

| | | | |
|---|---|---|---|
| CN | 106441319 A | 2/2017 | |
| CN | 107167130 A | 9/2017 | |
| EP | 0875731 B1 | 7/2003 | |
| JP | 4356566 B2 | 11/2009 | |
| WO | 0239063 A1 | 5/2002 | |
| WO | 2002039063 A1 | 5/2002 | |
| WO | WO-0239063 A1 * | 5/2002 | ............. G01C 21/30 |

OTHER PUBLICATIONS

PCT Written Opinion for International Application No. PCT/IL2019/050929, dated Nov. 27, 2019, 6pp.

PCT International Preliminary Report on Patentability for International Application No. PCT/IL2019/050929, dated Feb. 23, 2021, 7pp.

\* cited by examiner

METHOD AND SYSTEM FOR REAL-TIME VEHICLE LOCATION AND IN-VEHICLE TRACKING DEVICE

CROSS-REFERENCE TO RELATED PUBLICATIONS

This application is a Continuation-in-Part (CIP) of International (PCT) Pat. Appl. No. PCT/IL2019/050929, filed 20 Aug. 2019, and claims priority from Israel Pat. Appl. No. 261237, filed 20 Aug. 2018. Both of these prior applications are incorporated by reference in their entirety.

FIELD OF THE INVENTION

This invention relates in general to methods and systems for obtaining information regarding the position and identity of a moving vehicle in real time. It relates specifically to means and method for determining the vehicle's position by use of measurements of the vehicle's linear and angular velocities in relation to a data layer extracted from a GIS map data base, without any necessity for use of an inertial navigation system or continuous GPS reading.

BACKGROUND OF THE INVENTION

Automated methods that can accurately determine the position and attitude of a moving vehicle are highly desired. Such methods would be useful not only for anyone who wants to arrive at an intended destination as quickly and safely as possible without having to consult a physical map, but also as a means of determining the correct position and attitude of driverless vehicles, which need to be able, for example, to avoid undesired close proximity to the edges of the road or sharp curves. It is also required that common navigation software operating in smartphones will be able to operate without GPS intensive usage. Such method will contribute twice: improve battery current draw and improve the accuracy of the position displayed on those navigation application maps. In a car tracking device there is a need for an apparatus which can consume low current for operation. Such an apparatus can be used as a small electronic device attached to the front glass of a car and be powered by solar power without the need to connect it to the car OBD or electric cables.

Most methods that have been developed so far depend on an external reference with no drift such as a Global Positioning System (GPS). GPS-based methods can be quite accurate (to within tens or even one figure of meters), but the ability to use such a method depends on the vehicle being able to receive a signal from a GPS satellite, and in some situations (e.g. travel through a tunnel, rainy forest, step lanes or urban malls), such reception is not possible.

Other methods depend on the use of an inertial navigation system (INS) that calculates the position, direction and speed of travel from internal sensors such as a rate gyro, accelerometer, or magnetometer, and in some cases velocity sensors. The main problem with these systems is that errors in the determination of the position and direction of motion of the vehicle are cumulative, and so even small errors for any specific calculation rapidly turn into large errors, so without some kind of external reference, INS-based systems and methods are not really useful for travel over long distances without the use of costly drift sensors.

The combination of INS and GPS systems gives reasonable positional accuracy, but still suffers from the inherent GPS errors described above.

Several approaches to overcoming these difficulties are known in the art. Chinese Pat. Appl. Pub. Nos. 101586962, 106441319, 107167130, and 101936737 disclose methods for correcting positional errors of an INS or GPS by comparison with a map or satellite photographs, either according to a predetermined route of travel, by using steering angles to correlate the measured travel path to a path on the map, or by using known map matching algorithms.

U.S. Pat. No. 6,282,496 discloses an inertial guidance system in which the outputs of an accelerometer and an angular rate sensor are transformed to an inertial frame of reference. This output is then passed to a Kalman filter along with the outputs of such sensors as an inclinometer or a magnetometer to produce a signal corresponding to the vehicle's position and heading. This signal is calibrated by comparison with an external signal, e.g. from a map or a GPS. The recalibrated position and heading signals are used as inputs to calibrate the inertial guidance system, thereby correcting errors in the inertial guidance system output (e.g. to account for sensor drift).

Japanese Pat. No. 4356566 discloses a car navigation system. The system comprises an inertial guidance system that is corrected by comparison with map or GPS data.

U.S. Pat. Appl. Pub. No. 20030191583 discloses a car navigation system that comprises a locator device that is calibrated by a map that is external to the vehicle, the map data being transmitted to the locator device.

U.S. Pat. Appl. Pub. No. 20100332126 discloses a navigation system in which an INS is corrected by reference to a map and use of a trajectory calculator.

U.S. Pat. Appl. Pub. No. 2013085666 discloses a navigation system in which the status of an INS is monitored by comparison with map and GPS data, and the INS corrected by recursive calculations if it is determined to be in an abnormal state.

U.S. Pat. Appl. Pub. No. 2016146616 discloses a method and apparatus of vehicle positioning that uses map matching as feedback for an integrated navigation system in which a map and navigation is coupled with an INS using low-precision vehicle sensors when the vehicle cannot receive a GPS signal. As soon as the system determines that the GPS signal has returned, the system reverts to navigation by the GPS.

All of these systems suffer from the drawback that they need a dedicated inertial navigation system or GPS. A navigation system that does not rely on a dedicated INS and that does not need to be in constant contact with an external source of data (e.g. a GPS) thus remains a long-felt, yet unmet need.

A single easily-installed device that combines these functionalities in a self-contained autonomous unit while keeping the identity of the vehicle concealed and secure likewise remains a long-felt, but as yet unmet need.

SUMMARY OF THE INVENTION

The invention disclosed herein is designed to meet this long-felt need. The invention comprises a method for determining the position of a moving vehicle that does not rely on continuous communication with a position system such as a GPS or an INS; rather, the system relies on correlation of the vehicle's travel as determined by sensors traveling with the vehicle with data from a specially constructed map layer. The invention herein disclosed also includes an apparatus that incorporates a tracking system into a single tag that can easily be installed. By using wireless communication and a solar power system, the unit is completely self-contained and autonomous and does not include any wired connection to any location or device external to the device.

It is therefore an object of the present invention to disclose a method for calculating the position and direction of a moving vehicle, wherein said method comprises: determining said vehicle's axial velocity at time t from output of a axial velocity sensor in physical contact with, and at a known orientation relative to, said vehicle; determining said vehicle's angular velocity at time t from output of an angular velocity sensor in physical contact with, and at a known orientation relative to, said vehicle; calculating from said axial velocity and said angular velocity a calculated arc A along which said vehicle is moving, said calculated arc A characterized by a calculated radius R; extracting from a map an estimated arc A' along which said vehicle is moving, said estimate arc A' characterized by an estimated radius R; and, obtaining at least one correlation selected from the group consisting of: (a) a correlation between said calculated arc A and said estimated arc A; and, (b) a correlation between said calculated radius R and said estimated radius R', thereby obtaining said vehicle's position and direction. In preferred embodiments of the invention, the method does not make continuous use of any data obtained from a guidance system not in physical contact with said vehicle or an inertial guidance system. In some especially preferred embodiments of the invention, the method does not use any data obtained from a guidance system not in physical contact with said vehicle or an inertial guidance system except for an initial determination of the vehicle's position. In some preferred embodiments of the invention, the method does not make use of any step comprising Kalman filtering.

It is a further object of this invention to disclose a method for calculating the position and direction of a moving vehicle, wherein said method comprises: determining said vehicle's position at time t0; determining said vehicle's linear velocity at time t>t0 from output of a linear velocity sensor in physical contact with, and at a known orientation relative to, said vehicle; determining said vehicle's angular velocity at said time t from output of an angular velocity sensor in physical contact with, and at a known orientation relative to, said vehicle; calculating from said linear velocity and said angular velocity a calculated arc A along which said vehicle is moving, said calculated arc A characterized by a calculated radius R; obtaining a map layer; extracting from said map layer an estimated arc A' along which said vehicle is moving, said estimate arc A' characterized by an estimated radius R'; and, obtaining at least one correlation selected from the group consisting of (a) a correlation between said calculated arc A and said estimated arc A; and (b) a correlation between said calculated radius R and said estimated radius R; thereby obtaining said vehicle's position and direction. In preferred embodiments of the invention, the method does not make continuous use of any data obtained from a guidance system not in physical contact with said vehicle or an inertial guidance system. In some especially preferred embodiments of the invention, the method does not use any data obtained from a guidance system not in physical contact with said vehicle or an inertial guidance system except for an initial determination of the vehicle's position. In some preferred embodiments of the invention, the method does not make use of any step comprising Kalman filtering.

It is a further object of this invention to disclose the method as defined in any of the above, wherein said axial velocity sensor is selected from the group consisting of said vehicle's speedometer and said accelerometer.

It is a further object of this invention to disclose the method as defined in any of the above, wherein said angular velocity sensor comprises at least one sensor selected from the group consisting of rate gyros and magnetometers.

It is a further object of this invention to disclose the method as defined in any of the above, wherein step of correlating comprises: scanning N samples of curvature of said vehicle's path ($R_i$), N>1, from said sensors; scanning N samples of curvature of said vehicle's path ($R'_i$) from said map; and, finding a closest match between said samples $R_i$ and said samples from said sensors and said samples from said property of arcs GIS map data layer. In some preferred embodiments of the invention, each sample $R_i$ comprises three location points. In some preferred embodiments of the invention, said step of scanning comprises scanning said sensors at a rate of 300 Hz. In some preferred embodiments of the invention, said step of scanning comprises scanning said sensors at a rate sufficient to provide a distance resolution of at least 10 cm. In some preferred embodiments of the invention, said step of finding a closest match comprises finding a closest match by performing a least-squares analysis of differences between $R_i$ and $R'_i$ for each value of i.

It is a further object of this invention to disclose the method as defined in any of the above, comprising: filtering said results of said step of obtaining a correlation between said arc A and said arc A'; and, feeding back results of said step of filtering to at least one component selected from the group consisting of a position streamer configured to extract from a geographic information system database and a polyline that approximates a region being measured by said sensors; and said angular velocity sensor. In some embodiments of the invention, said step of filtering comprises Kalman filtering.

It is a further object of this invention to disclose the method as defined in any of the above, comprising downloading and storing map information for use in said calculations.

a further object of this invention to disclose the method as defined in any of the above, comprising downloading and storing earth 3D, magnetic fields information for use in said calculations.

It is a further object of this invention to disclose the method as defined in any of the above, wherein said step of scanning N samples of curvature of said vehicle's path ($R'_i$) from said map comprises: obtaining three points that lie on a polyline constructed from travel of said vehicle, said three points comprising two outer points and an inner point; in a case in which neighboring points on said map property arcs GIS map data layer. are characterized by a separation comparable to or smaller than a distance between successive points obtained from scanning of said sensors, calculating a curvature signal for travel in an xy plane as a radius of a circle defined by said three points; and, in a case in which neighboring points on said map are characterized by a separation significantly larger than said distance between successive points obtained from scanning of said sensors, calculating a curvature signal for travel in an xy plane as a radius of curvature of a turn about said inner point allowed by said map.

It is a further object of this invention to disclose the method as defined in any of the above, wherein said vehicle travels along a path characterized on said map by a first road and a second road meeting with an angle $\alpha$ therebetween, a point O on a vertex of said angle, a point D in a center of a lane in which said vehicle is traveling prior to said meeting of said two roads, a point B along a polyline passing through said meeting of said two roads, and angle $\beta = \angle BOD$;

wherein said step of scanning N samples of curvature of said vehicle's path ($R'_t$) from said map comprises calculating a radius of curvature $R_t$ through said travel from said first road to said second road as $$R_t = \frac{d}{2}$$

when $$D(P_2, P_t) < \frac{d}{2} \cdot \tan\beta\left(= \frac{d}{2} \cdot \tan\left(\frac{180° - \alpha}{2}\right)\right),$$

otherwise $R_t = \infty$.

It is a further object of this invention to disclose the method as disclosed in any of the above, wherein said step of obtaining a correlation between said arc A and said arc A' comprises determining each of said arcs A and A' from a polynomial fit to at least 3 points along each of said arcs.

It is a further object of this invention to disclose the method as defined in any of the above, comprising producing a curvature signal based on map altitude information. In some preferred embodiments of the invention, said step of comprising producing a curvature signal based on map altitude information comprises: comparing a pitch signal from said angular motion sensor to data relating to an xy plane of said map; comparing a pitch signal from said angular motion sensor to data relating to an xz plane of said map; comparing a magnetometer signal to data relating to an xy plane of said map; comparing an altimeter signal to data relating to an xz plane of said map; correlating each pair of signals; and, producing a curvature signal based on the best correlation obtained.

It is a further object of this invention to disclose the method as defined in any of the above, comprising producing a curvature signal in a plane of travel by using a magnetometer at a point at which earth's magnetic field deviates from true (geographic north) by an angle D. In some preferred embodiments of the invention, said step of producing a curvature signal comprises: measuring x and y components of earth's magnetic field, $H_x$ and $H_y$, respectively; calculating an angle $$\alpha = \arctan\left(\frac{H_y}{H_x}\right);$$

and, calculating $\theta = \alpha \pm D$, wherein $\theta$ is an angle of travel relative to true north.

It is a further object of this invention to disclose a self-contained integrated portable vehicle tracking system, comprising: a microcontroller unit (MCU) 108, comprising memory, a cryptographic engine, and a processor; a wireless transceiver 110 in communication with said MCU; a power source 113; a power management system configured to control said power source; and, optionally, an identification lanyard 107 connected to said MCU; wherein said vehicle tracking system is contained within a single container unit. In some preferred embodiments of the invention, said vehicle tracking system does not comprise any wired connection to any device or location external to said container unit. In some preferred embodiments of the invention, said container unit is configured to be attached to a window of a vehicle. In some preferred embodiments of the invention in which the system comprises an identification lanyard, information uniquely identifying at least one of said vehicle and said self-contained integrated portable vehicle tracking system is stored within said identification lanyard.

It is a further object of this invention to disclose a self-contained integrated portable vehicle tracking system as defined in any of the above, comprising: a GPS receiver 109 in communication with said MCU; and, a GPS patch antenna 104 connected to said MCU via a serial bus and to said GPS receiver.

It is a further object of this invention to disclose a self-contained integrated portable vehicle tracking system as defined in any of the above, wherein one side said of said container unit comprises attachment means for attaching said container unit to a portion of a vehicle, and if said self-contained integrated portable vehicle tracking system comprises an identification lanyard, said container unit is configured such that said connection between said identification lanyard and said MCU passes through or over said attachment means.

It is a further object of this invention to disclose a self-contained integrated portable vehicle tracking system as defined in any of the above, wherein said power source 113 comprises a solar cell.

It is a further object of this invention to disclose a self-contained integrated portable vehicle tracking system as defined in any of the above, wherein said power source comprises a rechargeable battery connected to said power management system, and further wherein said power management system comprises at least one regulator, a battery charger, switching transistors, and integrated circuits configured to charge said rechargeable battery when energy balance conditions allow it and to discharge said rechargeable battery when said solar cell does not provide sufficient energy to run said portable vehicle tracking system.

It is a further object of this invention to disclose a self-contained integrated portable vehicle tracking system as defined in any of the above, comprising a three-axis accelerometer in communication with said MCU and connected to said power management system.

It is a further object of this invention to disclose a self-contained integrated portable vehicle tracking system as defined in any of the above, comprising a rate gyro in communication with said MCU and connected to said power management system.

It is a further object of this invention to disclose a self-contained integrated portable vehicle tracking system as defined in any of the above, comprising a three-axis magnetometer in communication with said MCU and connected to said power management system.

It is a further object of this invention to disclose a self-contained integrated portable vehicle tracking system as defined in any of the above, comprising a tilt sensor in communication with said MCU and connected to said power management system.

It is a further object of this invention to disclose a self-contained integrated portable vehicle tracking system as defined in any of the above, wherein all communication connections between system components and all communication between system components and locations external to said container unit are configured such that said communication is secure.

It is a further object of this invention to disclose a self-contained integrated portable vehicle tracking system as defined in any of the above, comprising transmitting means for transmitting a number associated to a mobile device and means for transmitting an acknowledgment from said mobile device to said computer located at cloud.

It is a further object of this invention to disclose a self-contained integrated portable vehicle tracking system as defined in any of the above, comprising a CANBUS in communication with at least one component of a system of said vehicle selected from the group consisting of said vehicle's power system; said vehicle's camera system; said vehicle's radar system; said vehicle's wheel tracker; said vehicle's computer system; said vehicle's on-board diagnostics; and said vehicle's navigation system.

It is a further object of this invention to disclose a self-contained integrated portable vehicle tracking system as defined in any of the above, wherein a map layer is stored in said memory.

It is a further object of this invention to disclose a self-contained integrated portable vehicle tracking system as defined in any of the above, wherein said MCU is programmed to calculate a position of a vehicle with which said system is traveling according to the method as defined in any of the above.

It is a further object of this invention to disclose the method for calculating the position and direction of a moving vehicle as defined in any of the above, comprising: obtaining a self-contained integrated portable vehicle tracking system as defined in any of the above, wherein said MCU is programmed to calculate the position of a vehicle according to said method; attaching said self-contained integrated portable vehicle tracking system to a vehicle; and, using said MCU to perform said method, thereby determining said position of said vehicle.

BRIEF DESCRIPTION OF THE DRAWINGS

The invention will now be described with reference to the drawings, wherein.

DETAILED DESCRIPTION OF THE PREFERRED EMBODIMENTS

Figure 1:
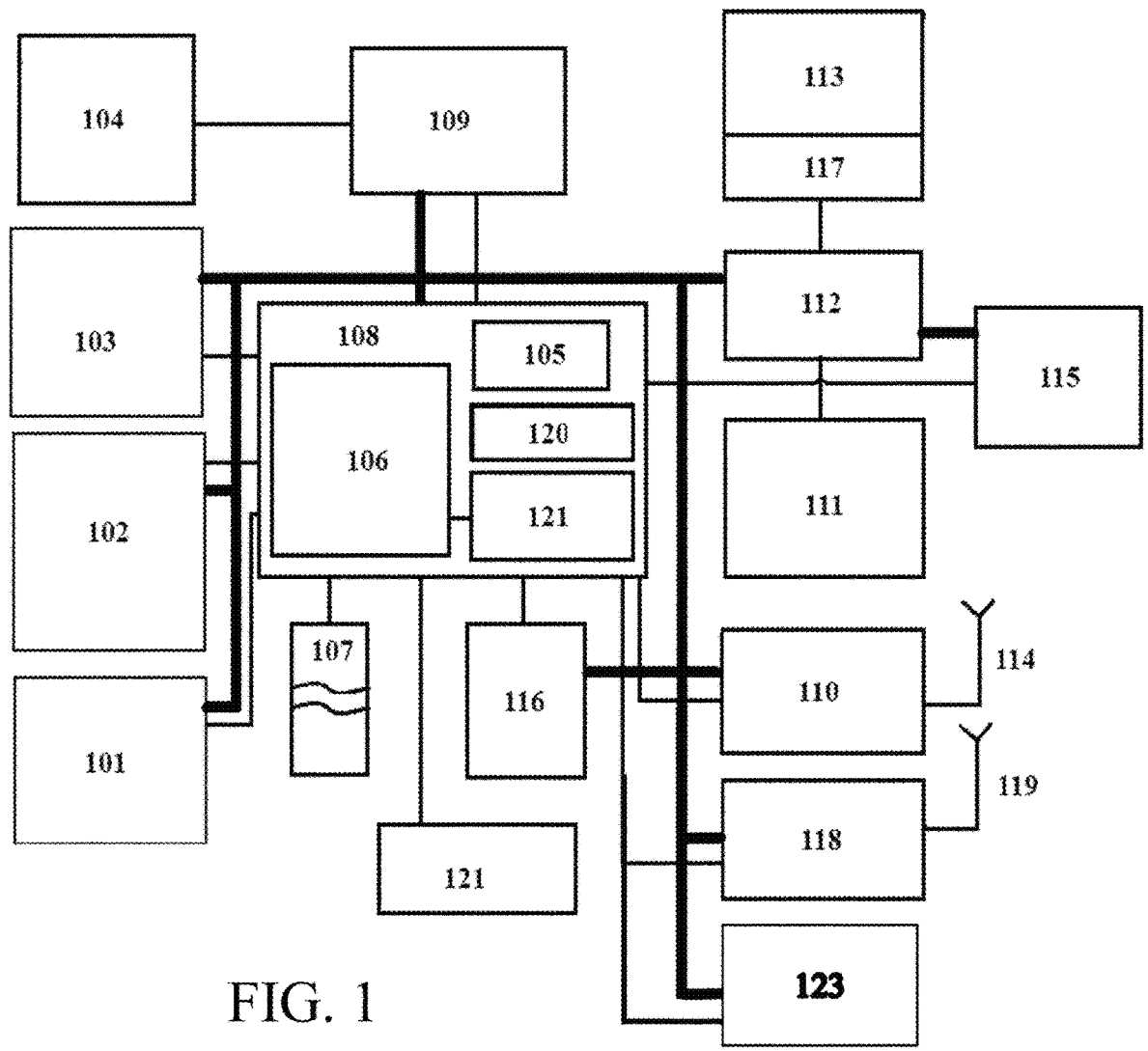
FIG. 1 presents a schematic block diagram of one non-limiting embodiment of the architecture of the portable integrated vehicle tracking system herein disclosed.

In the following description, various aspects of the invention will be described. For the purposes of explanation, specific details are set forth in order to provide a thorough understanding of the invention. It will be apparent to one skilled in the art that there are other embodiments of the invention that differ in details without affecting the essential nature thereof. Therefore, the invention is not limited by that which is illustrated in the figure and described in the specification, but only as indicated in the accompanying claims, with the proper scope determined only by the broadest interpretation of said claims. Moreover, in some cases, for clarity or conciseness, some components of the system or steps of the method are described independently. Nonetheless, any combination of elements described herein that is not self-contradictory is considered by the inventors to be within the scope of the invention.

As used herein, the term "I-sticker" or "Chip/Module" refers to the device of the present invention.

As used herein, the abbreviation "GPS" stands for "global positioning system."

As used herein, the abbreviation "GIS" stands for "geographic information system."

As used herein, the term "map" refers to a set of data or an algorithm that can be used to relate a location on the surface of the earth to a unique set of coordinates that define that location; specifically, as used in the algorithms discussed in detail below, the "map" or "map layer" refers to a reference data set that comprises rotational curve data. Thus, as the term is used herein, a "map" or "map layer" can in principle be created from a vehicle's angular velocity sensors alone or to convert any set of coordinates to a rotational curve for reference. In general, the unique set of coordinates will be a subset of a set of coordinates that assign particular coordinates to each of a set of points within a predetermined section of the earth's surface (which may be the entire surface of the earth or a portion thereof).

As used herein, the term "arc" is used to refer to a path taken by a moving vehicle. An "arc" may be a path that is more complicated than an arc of a circle (i.e. a path that can only be fit by a polynomial of order greater than 2). As the term "arc" is used herein, travel in a straight line is equivalent to travel along an arc having an infinite radius of curvature.

As used herein, the term "resolution," with reference to a map or an algorithm for determining the position of an object, refers to the distance between two adjacent coordinates, i.e. the smallest distance between two points that will lead to different unique sets of coordinates to be assigned to the two points. With reference to resolution, the term "at least" is used to refer to cases in which the smallest distance between two points that will lead to different unique sets of coordinates is no greater than the nominal value; for example, a resolution of "at least 10 cm" includes cases in which the resolution is 9 cm but excludes cases in which the resolution is 11 cm.

The invention herein disclosed provides a device and method for accurate and precise determination of the position of a vehicle. The device and method have several advantages over devices and methods known in the art. Particular examples of advantages of the invention disclosed herein include reduced reliance on external systems such as GPS systems while being able to determine position much more accurately than inertial navigation systems in common use; low energy requirements (in preferred embodiments, the device us powered by solar cells and has no wired connection to the vehicle); and low cost and ease of installation. In addition, in some embodiments, the device can be used for additional purposes, non-limiting examples of which include identification the vehicle in which it is located (e.g. for fleet management), keeping a record of the details of the vehicle's travel (history of locations visited, vehicle speed and acceleration, etc.), as a device for alerting the owner of the vehicle of attempts to break into or move the vehicle, and estimating the amount of pollutants emitted from the vehicle's exhaust.

The method and system herein disclosed do not require continuous connection to a GPS system. Rather, the device and system use a novel unique method of correlating the vehicle's position to a map information layer, relying on measurements made locally (on or in the vehicle) following an initial determination of the vehicle's position that can be from GPS data. In the inventive method and system, linear and angular velocities of the vehicle are determined from measurements made by sensors that travel with the vehicle. The map layer, which in various embodiments is either maintained in the device's non-volatile memory or downloaded from a database (e.g. a database maintained in the cloud), is used to determine the radii of curvature of road segments that are then correlated with the radii of curvature of segments traveled by the vehicle as determined from the output of the angular velocity sensor. In some embodiments, the system also includes a magnetometer that measures the strength and orientation of the local terrestrial magnetic field. The heading of the vehicle is then determined by correlation of a series of magnetometer measurements with values obtained from a map of the earth's magnetic field.

Reference is now made to FIG. 1, which presents a block diagram of one non-limiting embodiment 100 of the device ("I-sticker") herein disclosed. In preferred embodiments of the invention, power to the device is provided a solar cell array 113 that can provide 5V @ 90 mA on a bright day. Additionally or alternatively, the power can be obtained directly from the vehicle (115). The power source is connected to local power management system 112 that contains regulators, a battery charger, a power source, switching transistors, and integrated circuits. In preferred embodiments of the invention, the local power management system is also connected to a voltmeter—A/D converter system connected to the cell pins that monitors the cell array voltage and outputs a digital value proportional to the cell array voltage. In some embodiments of the invention, a rechargeable battery 111 (e.g. a rechargeable lithium battery) is provided as backup for the solar cell array or the direct power 117 (e.g. if the solar cell array has completely discharged under dark conditions). In preferred embodiments, the rechargeable battery is configured to be recharged by the vehicle's cigarette lighter (e.g. via a jack that fits the cigarette lighter) or other 6V source.

Data collection and control of the I-sticker is performed by MCU 108, which comprises a microprocessor with a memory (105) and a cryptographic engine (120). Any appropriate type of memory known in the art can be used. Non-limiting examples include flash memory for storing program code, parameter values, and map data, and RAM for computational data and data received in real time from the various measuring devices. The cryptographic engine is part of the MCU internal memory. In some embodiments of the invention, an extra device is connected to the MCU to enable the I-sticker to perform encryption and decryption of secure or proprietary information such as the details of the GIS maps, secure money transfer, etc. In some preferred embodiments of the invention in which positioning of the vehicle is performed by using the algorithm described in detail below, several layers 121 of the GIS map are stored in nonvolatile memory. In some embodiments, the I-sticker incorporates or is in data connection with means for downloading map information that is stored remotely.

The MCU controls the energy balance by reading the analog values by the A/D converter output; reads data output from system components (e.g. from the GPS receiver), and transmits data, preferably by wireless RF means such as WiFi 110 or BLE 118. In some embodiments of the invention, a unique identifier for the vehicle is stored in the MCU's memory. In some embodiments of the invention, a map layer is stored in the MCU's memory. In some embodiments of the invention, the MCU is programmed to determine the vehicle's position according to the algorithm described in detail below.

In preferred embodiments of the invention, the I-sticker comprises a GPS receiver 109 connected to GPS patch antenna 104. The GPS receiver sends data to the MCU through the patch antenna via a serial bus.

In preferred embodiments of the invention, the I-sticker comprises a triaxis rate gyro sensor 101 in data connection with the MCU. The rate gyro is configured to measure the angular motion of the vehicle while the vehicle is in motion. The rate gyro data is transferred to the MCU to be used in the positioning algorithm.

In preferred embodiments of the invention, the I-Sticker comprises a triaxis accelerometer 103 in data communication with the MCU. The accelerometer measures the vehicle's acceleration along three orthogonal axes and transmits the results of the measurements to the MCU for processing. While the vehicle is in motion, the accelerometer works constantly. When the vehicle is parked, however, the accelerometer will only be activated by sudden movements, for example, during an attempted theft or break-in, or if a second vehicle collides with the standing vehicle into which the I-Sticker has been installed. The accelerometer can thus be used as a tilt sensor, and in some preferred embodiments is configured to broadcast an alert (e.g. by sending a text message to a user's cellular phone) that a problem has arisen while the car is unattended.

In some preferred embodiments of the invention, the I-Sticker comprises a triaxis magnetic sensor (magnetometer) 102 in data connection with the MCU. The magnetic sensor is configured to determine the magnitude and direction of the local (terrestrial) magnetic field along three orthogonal axes. The values determined by the magnetometer are transferred to the MCU for use in the positioning algorithm.

In preferred embodiments of the invention, prior to its installation, the I-sticker's sensors are calibrated relative to the earth. In these embodiments, after installation, it is programmed to recalibrate itself automatically during the vehicle's travel to redefine the axes relative to the vehicle. This automatic recalibration is performed because the location of the I-sticker with respect to the vehicle is not determined until the moment of installation. The vehicle's yaw is determined (e.g. by the method described in detail below) during the vehicle's travel and from that determination, the Cartesian axes defined by the system components are established. In some embodiments of the invention, if the vehicle happens to travel a significant distance in a straight line, the recalibration may be done with the assistance of an INS. The recalibration of the I-sticker's may be performed by any method known in the art.

In some preferred embodiments of the invention, the I-sticker comprises an identification lanyard 107, which provides (e.g. in read-only memory) a unique identifier for the vehicle, e.g. the vehicle's VIN. In some especially preferred embodiments of the invention, the identification lanyard is attached such that if the I-sticker is removed from the vehicle, the identification means is no longer connected to the I-sticker, and the I-Sticker can then notify the server that the identification lanyard has been removed.

In some embodiments of the invention, the I-sticker also includes CANBUS 123. The CANBUS connects the local power management module 112 to the vehicle's computer, in particular its on-board diagnostic system. The connection can be wired or wireless (e.g. via the car's Bluetooth communication system). In these embodiments, the CANBUS can transmit to MCU 108 information regarding the vehicle's travel as determined by the vehicle's own instruments. For example, the CANBUS can be used to transmit the car's speed to the MCU and in these embodiments, can thus supplement or replace triaxis accelerometer 103.

In preferred embodiments of the invention, the entire I-Sticker, including the components that are used to make physical measurements such as the rate gyro, accelerometer and magnetometer, is contained within a single container unit. Because the I-Sticker relies on wireless communication to transmit and receive information and uses a solar power source, the container unit is entirely self-contained and has no wired connection with any device or to any location external to the I-Sticker container unit. Not only does this arrangement provide easy "set and forget" attachment of the I-Sticker to the vehicle's window (preferably its windshield), but it readily enables security features, as explained in detail below.

The I-sticker can be attached to any part of the vehicle from which the GPS antenna can receive information unobstructed. In embodiments in which the I-sticker obtains its power from solar batteries, it is attached to any part of the vehicle such that it can receive sufficient sunlight to power the solar power unit. In preferred embodiments, the sticker is glued to the inside of the vehicle's windshield. For example, in some exemplary preferred embodiments, the side of the container unit (e.g. the side of the sticker) that is to be fixed to the window of the vehicle is at least partially coated with adhesive. The adhesive can comprise any adhesive material known in the art appropriate for affixing the sticker to the window, or any adhesive system (e.g. adhesive tape) that comprises an adhesive material. In some particularly preferred embodiments, the identification lanyard is connected to the MCU via a connection that passes through the adhesive or atop the adhesive such that when the sticker is affixed to the window, the connection between the identification lanyard and the MCU passes through the adhesive or between the adhesive and the surface of the window. In these embodiments, removing the sticker from the window thereby disconnects the identification lanyard from the MCU by physically breaking the connection or by disconnecting it from at least one end as the lanyard and MCU are separated. The MCU can then send a signal (e.g. an SMS to the user's cell phone or a signal to a central server) that the I-Sticker has been tampered with.

In some embodiments of the invention, the MCU incorporates functionality 106 (e.g. as programming) that extracts GIS data from the locally stored GIS map layers. This functionality includes, in some embodiments, programming to determine in real time the vehicle's angular motion from the output of the rate gyro and the vehicle's linear velocity, e.g. from integration of the acceleration determined by the magnetometer. In these embodiments, the I-sticker is programmed to transform, preferably in real time, motion data obtained by the sensors in terms of three orthogonal axes in the sensors' reference frames to the earth's reference frame. This transformation can be done by any means known in the art, for example, by using rotation matrices to perform the coordinate transformation. As described in detail below, in a preferred method for determining the vehicle's position, a series of successive measurements from the rate gyro, preferably at least three, are used to calculate the radius of curvature of the arc through which the vehicle is moving in two dimensions, and the attitude change during that time is calculated from the magnetometer measurements of the local values of the earth's magnetic field.

In the case of travel along a straight line, the main cause of error in the use of sensors to determine the position of a vehicle is sensor drift. For travel along a curved path, or for travel at a speed that is not constant, the preferred method described in detail below eliminates inaccuracies caused by sensor drift. As is well-known in the art, the error of a rate gyro measurement increases as the third power of time. For typical commercially available low-cost rate gyros, errors of the order of magnitude of 10 m will be present after about 30 seconds of travel. Thus, for travel of more than 30 s without significant acceleration, synchronization of the rate gyro may be necessary in order to retain the desired positional accuracy. In some embodiments of the invention, errors due to sensor drift are corrected by use of the vehicle's yaw as measured by a magnetometer, as is described in detail below. In some embodiments of the invention, errors due to sensor drift are corrected by reference to the vehicle's own positioning system (GPS or INS).

As described in detail below, in preferred embodiments of the invention, the two groups of radii are correlated with two layers of the locally stored GIS data in order to determine the vehicle's position.

In preferred embodiments of the invention, these calculations are done by use of a dedicated algorithm, most preferably the algorithm described in detail below, and use of a special memory residing in the position extractor 106 section of the MCU. As explained in detail below, the algorithm used in these embodiments is based on calculation of radii of curvature of bends and turns along the path traveled by the vehicle. When such an algorithm is used, travel for long distances in a straight path can reduce the accuracy of the system. Therefore, in some embodiments of the invention, the module includes Kalman filtering calculated in parallel to improve the accuracy of the determination of the position of the vehicle. In some embodiments of the invention, the module is configured to have a data connection to the vehicle's own positioning system (e.g. an INS or GPS system) such that when the vehicle travels in a straight line, data from the vehicle's positioning system is used to supplement or replace data collected by the I-sticker's sensors in order to improve the accuracy of the system.

In some embodiments of the invention, the I-sticker is in communication with one or more components of the vehicle's electrical or navigational system. Depending on the component to which the I-sticker is connected, the communication can be via a physical or data connection, which can be wired or wireless depending on the specific connection and needs of the user. Non-limiting examples include a vehicular camera system, a vehicular radar system, and a vehicular navigation system (e.g. an INS). In some embodiments in which the I-sticker is in communication with a component of the vehicle's electrical or navigation system, the vehicle's speed is passed to the I-sticker MCU from the output of the vehicle's onboard computer, speedometer, or wheel ticker. In some embodiments of the invention, the I-sticker is in communication with the vehicle's own GPS system, which can supplement or replace the internal GPS receiver 109 and patch antenna 104. In some embodiments of the invention, the I-sticker is connected to the vehicle's electrical system, which can replace or supplement the solar energy source 113.

In those embodiments of the I-sticker in which it incorporates its own energy source, it can be used in a number of applications in which a low-cost, lightweight, and portable device for positional determination would be useful. For example, wearable versions of the I-sticker can be attached to the clothes or body, in order to provide a device for determining an individual's location (e.g. for runners or bicycle riders who want real-time information about location, distance traveled, etc.). The I-sticker can also be used for navigation or location of robots and remotely-controlled or self-controlled vehicles.

The present invention also discloses a method and system for providing real-time positioning information to a vehicle in which information about the vehicle's position is corrected and updated in real time by reference to an arc or the radius thereof that is extracted from a map. Information about the vehicle's travel is preferably obtained from the combination of the output of a sensor for measuring the vehicle's axial velocity (e.g. the vehicle's speedometer or accelerometer) with the output of a sensor for measuring angular velocity such as a gyro and/or magnetometer, but any source of velocity information may be used. In preferred embodiments of the invention, the sensors are in physical contact with the vehicle in known orientations relative to the vehicle. In especially preferred embodiments of the invention, the sensors are fixed to the vehicle. Non-limiting examples of alternative sources of velocity information include accelerometers, and GPS. The information derived from the map enables correction and improvement of the inadequacies and disadvantages of existing inertial guidance systems, for example, situations in which the GPS is insufficiently accurate, situations in which there is no GPS signal reception for an extended period of time, or sensor drift.

Because the method disclosed herein obtains sensor data in differential mode (i.e. as a currently measured value relative to a previous value) rather than as absolute values, in general, sensor drift will not affect the accuracy of the measurements. The method disclosed herein thereby provides improved accuracy and precision relative to methods known in the art without relying on continuous reference external sources of positional data such as a GPS or INS. In addition, the method disclosed herein takes advantage of the high accuracy and linearity during rotation of off-the-shelf components such as commercially available rate gyro sensors.

Although the following description primarily describes the method in terms of the yaw axis of the rate gyro, one of ordinary skill in the art will readily appreciate that the method can calculate travel in three dimensions by using pitch and/or roll parameters. Commercially available components are sufficiently accurate that even such small motions along the z-axis as travel over a speed bump can be detected and measured.

The invention disclosed herein presents the map information differently from existing systems that use map information to correct INS or other navigational data. The unique way in which the map is presented in the present invention makes the calculations of corrections of INS positional data simpler, more efficient, and more applicable to technology in general use today. In contrast to methods and systems known in the art, in the method and system of the invention disclosed herein, map information such as highway lanes, local terrain, and the arc and radius of the path traveled by the vehicle is correlated directly to information obtained from the angular velocity sensors (e.g. a rate gyro or magnetometer) without any necessity to process either the INS/GPS data or the map data except for the initial location and for a long drive on a straight road.

1. Basic System Architecture

A basic principle of the invention disclosed herein is to represent map information as a separate map layer as a collection of samples having a new physical (scalar) dimension. The map layer can be read as the degree of curvature of the terrain, pathway, or roadway. In some embodiments of the invention, the map data is obtained in real time from a server external to the vehicle. In other embodiments, the map data is downloaded to an appropriate storage device that travels with the vehicle.

An arc on the map is created from a set of three or more points. In the case in which the set comprises three points, the arc can be represented by its radius. As discussed in detail below, in some embodiments of the invention, an arc comprising N points is represented by a polynomial of degree N−1. In the case in which the path is represented as a radius, three successive points are chosen and the radius calculated as described below.

Non-limiting examples of such sensors include rate gyros and magnetometers. A frame reference calculation can be performed in order to determine the angular velocity. Any method of performing the frame reference calculation known in the art may be used. One non-limiting example is the NED (north east down) coordination method. The frame reference is related to the map layer during correction of calibration errors of the sensor itself and transformation of the plane of the instrument to the earth's surface.

From the combination of the angular and linear velocities obtained from the sensors in contact with the vehicle, the arc along which the vehicle is travelling (and/or the radius thereof) is calculated. These arcs or radii or groups thereof are directly analogous to the estimated arcs and radii extracted from the map layer. The arcs calculated from the sensors are then compared with the estimated arcs extracted from the map layer. In preferred embodiments of the invention, the comparison is performed by correlating the two sets of arcs and/or radii. Any suitable mathematical algorithm that can be used to determine a parameter that is related to the similarity (e.g. determination of the covariance of the arcs and/or radii) may be used. The comparison between the arcs and/or radii obtained from the sensors and those extracted from the map layer provides the map coordinates of the best match between the map layer and the vehicle sensors. The coordinates of this best match generate a new position. The position determined by the comparison of the arc extracted from the map and that determined by the velocity sensors is significantly more accurate than a position obtained by dead reckoning or other positioning methods known in the art, and moreover, does not require the continual use of an external positioning system such as a GPS or an internal INS.

In cases in which the map data is two-dimensional (i.e. does not contain any information about elevation as a function of position), or the travel of the vehicle is approximated as being in the xy plane (i.e. without any changes in elevation), then the radius of curvature will necessarily be a vector in the xy plane. In cases in which the map does contain three-dimensional data, then the plane containing the three points that form the arc will not necessarily be coincident with the map's xy plane (i.e. the surface of the earth). In this case, the radius of the arc, which will be at an angle relative to the xy plane, can be decomposed into its projections on the xy, xz, and yz planes from the yaw, pitch, and roll angles determined by the rate gyro.

Figure 2:
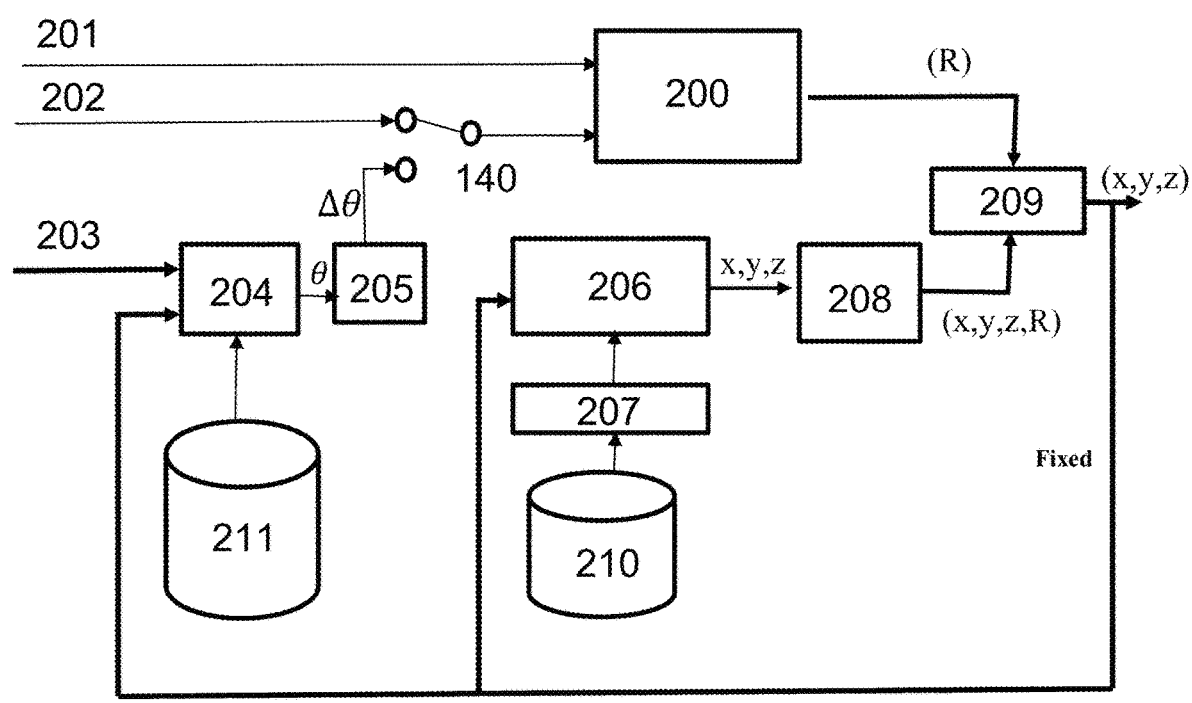
FIG. 2 presents a schematic diagram of the position system and method herein disclosed.

Reference is now made to FIG. 2, which presents a schematic diagram of one non-limiting preferred embodiment of the system and method of the invention disclosed herein. In this embodiment, output of a sensor (201) configured to determine the vehicle's linear velocity is combined with angular velocity data obtained from at least one sensor configured to determine the vehicle's angular velocity (202, 203). These sensors are in physical contact with the vehicle and travel with it. In preferred embodiments, they are attached to the vehicle in predetermined orientations.

Non-limiting examples of sensors configured to measure the vehicle's axial velocity include the vehicle's speedometer and accelerometer. Non-limiting examples of sensors configured to measure the vehicle's angular velocity include sensors such as a rate gyros that measure the angular motion of the vehicle directly (202) and sensors such as magnetometers configured to measure the intensity and direction of the earth's magnetic field at the vehicle's current location that provide positional data from which the angular velocity can be derived (203). In cases in which a magnetometer is used, the magnetometer is used to determine the vehicle's position by relating the intensity and direction of the earth's magnetic field at the vehicle's location to a map of the earth's magnetic field (211) that correlates these values with the vehicle's positions. High-resolution global maps of the earth's magnetic field are well-known in the art. In preferred embodiments, the output of the magnetometer is passed along with the information from the magnetic map to a "magnet fix" module (204) that converts the positional data obtained from the magnetometer to the angular motion of the vehicle (205). A detailed explanation of how this conversion is performed is given in detail below.

In the embodiment of the invention shown in FIG. 2, the sensor used to determine the vehicle's angular velocity is chosen via use of switch 215. In other embodiments, two or more sensors can be used simultaneously and their output combined to provide more accurate data. In some embodiments, multiple sensors are connected via an appropriate switch or logic gate (e.g. an OR gate) that allows the user to select one or more of a plurality of sensors.

As the vehicle travels, the combined output of the linear velocity sensor(s) and the angular velocity sensor(s) is used to calculate the path of the vehicle (200), for example as the radius of curvature of the arc made by the last three points sampled by the sensors or as a polynomial curve representing the vehicle's travel through three or more points. In preferred embodiments, this calculation is done by a "radius calculator" that comprises a CPU programmed to calculate the radius and/or arc of the travel of the vehicle. A detailed explanation of how this calculation is performed is given in detail below. The radius or arc is continuously updated as the vehicle travels. As each new point sampled by the linear and angular velocity sensors is obtained, a calculation of the arc and/or radius of curvature is performed based on the N latest determinations made by the sensors (N>3). The sampling rate is typically 300 Hz.

In some preferred embodiments of the invention, information from the map layer is passed to a "position streamer" 206, which extracts points and a polyline (a collection of straight line segments connecting successive points on the map, as explained in detail below) from a GIS database 210. At this stage, the position on the map is used to calculate an estimated radius 208, as described in detail below.

The arc and/or radius extracted from the map layer is compared (209) to an analogous arc (or the radius thereof) determined from the output of the velocity sensors, and the position of the vehicle determined from this comparison, as described in detail below.

2. Curvature Signature Correlation

The heart of the algorithm for correcting the coordinates of the map system is the use of a correlation between the curvature of the path taken by the vehicle as determined from the output of the velocity sensors and the curvature signal produced by the map. In practice, a search is performed for the section of the map that most closely matches the path produced by the velocity sensors.

Figure 3A:
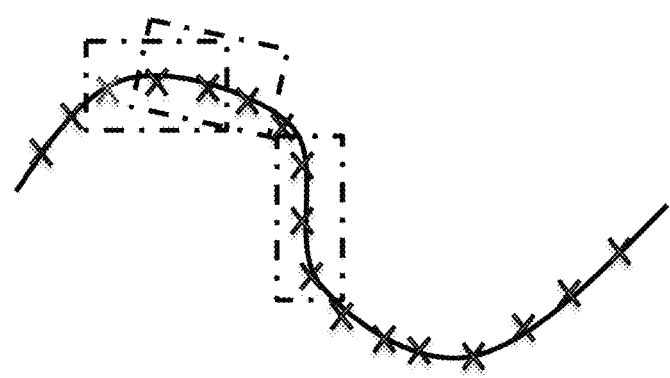
FIGS. 3A and 3B schematically illustrate, respectively, a series of scanned points from a map and from the path taken by a vehicle, the latter collected into successive samples of three points.
Figure 3B:
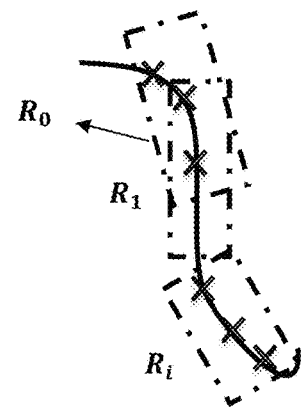

The algorithm continuously scans N samples of the path curvature. In preferred embodiments, each sample $R_i$ comprises three location points. For a vehicle traveling at a typical highway speed of 100 km/h, a sampling speed of 300 Hz will be sufficient to provide a spatial resolution of on the order of 10 cm. In preferred embodiments of the invention, the sampling speed used to determine the sample is at least 300 Hz, which provides a resolution sufficient to be able to determine, for example, in which lane of a multi-lane highway the vehicle is located. A scan is likewise performed as well on the path obtained from the map. The algorithm then attempts to find a sequence of N points from the velocity detectors that is closest to the sequence of N points obtained from the map. Reference is now made to FIG. 3, which illustrates schematically the sequence of points from the scan of the map (FIG. 3A) and three samples ($R_0$, $R_1$, and $R_2$) from a section of the path taken by the vehicle as determined by the velocity sensors (FIG. 3B).

The correlation can be performed by any method known in the art. In preferred embodiments, the position K is determined by finding the best correlation between the sequence of positions obtained from the velocity detectors $r(n)=\{R_i\}_1^N$ and the sequence of positions obtained from the map $r'(n)=\{R'_n\}_1^N$. Any means known in the art can be used. In some non-limiting embodiments of the invention, the best correlation is calculated by a least-squares analysis of the difference between $R_i$ and $R'_i$, i.e. from finding the value of k that minimizes the value of expression (1):

$$(\Sigma_{i=k-N+1}^{i=K}(R_i-R'_i)^2) \quad (1)$$

As shown in FIG. 2, information about the vehicle's speed obtained from the speedometer is combined with measurements of the angular velocity (e.g. a gyro or magnetometer with magnetic map information) to calculate the next position of the vehicle.

3. Creation of the Map Layer

As was described above, the instant invention determines the position and movement of a vehicle with reference to a map. The map can be stored in the memory of the device on which the calculations of the travel of the vehicle are performed, stored in a separate location in data communication with the device on which the calculations of the travel of the vehicle are performed, or downloaded (e.g. from an internet site or the cloud). On the one hand, in general, the download speed of the map will not be sufficiently fast to allow simultaneous real-time calculation of the travel of the vehicle and download of map information. On the other hand, the vehicle may be in a location where download of map information is not possible (e.g. reception of signals is blocked when the vehicle travels through a tunnel). Therefore, in some preferred embodiments of the invention, local map information is downloaded and stored temporarily in the device on which the calculations are performed or on storage media in data communication with the device. The map information is periodically updated as the vehicle travels.

The path or highway is represented on the map by a collection of straight line segments connecting successive points on the map to form a polyline. The following discussion describes the calculations necessary to produce the curvature signal in the case of a two-dimensional path (travel on a single plane), i.e. the case in which the map is a planar representation of the terrain. One of ordinary skill in the art will readily understand that the calculations can easily be extended to the case of travel in three dimensions (i.e. travel in terrain that rises and falls) in the case in which the map includes information about altitude as a function of position.

4. Calculation of Curvature

4A. General Considerations

The calculation of the curvature signal (in the case in which the travel is considered to be in a single plane) begins with considering three points that lie on the polyline. These points can be represented by one or more samples that describe the degree of curvature of the path or terrain.

Figure 4A:
FIGS. 4A and 4B illustrate schematically the procedure for calculating the curvature signal for cases of a high-resolution map and a low-resolution map, respectively.

In the case in which the map resolution is high, that is, the distance between neighboring points on the map is comparable to or smaller than the distance between successive points on the path traveled by the vehicle as determined by the velocity sensors, the degree of curvature is determined directly from a determination of the radius of the circle defined by the three points. Reference is now made to FIG. 4A, which presents a schematic illustration of this case, in which the three points determined from the velocity sensor output are indicated by crosses.

Figure 4B:
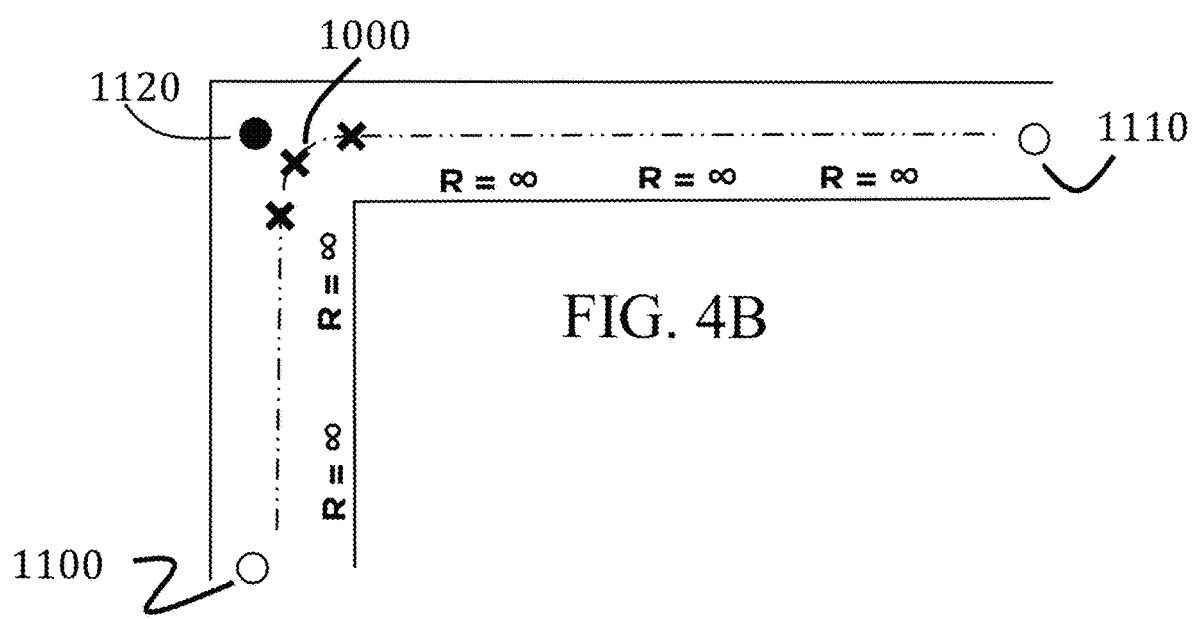

In the case in which the map resolution is low, that is, the distance between neighboring points on the map is significantly larger than the distance between successive points on the path traveled by the vehicle as determined by the velocity sensors (i.e. the line segment drawn between two points on the map is significantly longer than the line segments determined from the samples derived from the velocity sensor output), the three points lying on the polyline derived from the velocity sensor data may appear on the map as a straight line (infinite radius of curvature). Reference is now made to FIG. 4B, which presents a schematic illustration of this case. The points 1000 derived from the velocity sensor data are indicated by crosses, and the points on the map correlated with these points (1100, 1110, and 1120) are indicated by circles. As can be seen in the illustration, while the map does not have sufficient resolution to permit a one-to-one correspondence with the points derived from the velocity sensor data, the only possible turn with a radius of curvature equal to that of the curve determined from points 1000 is a turn about point 1120 (filled circle).

The map information (curvature signal R) can be calculated in real time or by creation in advance of a unique map layer and storage in the device's memory.

4B. Calculation of a Circle from 3 Points

In the case in which angular velocity is determined from the output of a sensor such as a magnetometer from which positional changes are determined in terms of changes in coordinates (e.g. Cartesian coordinates x, y, z), the radius of curvature of the arc through which the vehicle travels is calculated from three successive positions of the vehicle. The principle of calculation of a circle given three points was already known to Euclid, and methods for calculating the circle are of course well-known in the art. In the invention herein described, the calculation of the radius of curvature of a path from three points obtained either from a map or derived from the output of the velocity sensors can be performed by any means known in the art. For completeness of disclosure, one non-limiting preferred method is now described.

The general formula for a circle in the xy plane is given by eq (2):

$$X^2 + Y^2 + CX + DY + F = 0 \quad (2)$$

Given three points on a circle $(x_1, y_1, z_1)$; $(x_2, y_2, z_2)$; and $(x_3, y_3, z_3)$, the values of C, D, and F can be found from the solutions to the three simultaneous equations (3a), where i=1, 2, or 3, which are more conveniently solved when put in the form (3b).

$$X_i^2 + Y_i^2 + CX_i + DY_i + F = 0 \quad (3a)$$

$$X_i C + Y_i D + F = -X_i^2 - Y_i^2 \quad (3b)$$

The equations can be solved by application of Cramer's Rule to the system of three linear equations, eqs (4a) and (4b):

$$A = \begin{pmatrix} a_{11} & a_{12} & a_{13} \\ a_{21} & a_{22} & a_{23} \\ a_{31} & a_{32} & a_{33} \end{pmatrix} = \begin{pmatrix} X_1 & Y_1 & 1 \\ X_2 & Y_2 & 1 \\ X_3 & Y_3 & 1 \end{pmatrix} \quad (4a)$$

$$b = \begin{pmatrix} b_1 \\ b_2 \\ b_3 \end{pmatrix} = \begin{pmatrix} -X_1^2 - Y_1^2 \\ -X_2^2 - Y_2^2 \\ -X_3^2 - Y_3^2 \end{pmatrix} \quad (4b)$$

We define matrix $A_k$ as matrix A in which the kth column has been replaced with the vector b. Application of Cramer's Rule yields values of C, D, and F according to eqs (5):

$$C = \frac{|A_1|}{|A|} \quad D = \frac{|A_2|}{|A|} \quad F = \frac{|A_3|}{|A|} \quad (5)$$

Adding the terms $$\left(\frac{C}{2}\right)^2, \left(\frac{D}{2}\right)^2,$$

and −F to both sides of eq (2) yields eq (6):

$$\left(X + \frac{C}{2}\right)^2 + \left(Y + \frac{D}{2}\right)^2 = \left(\frac{C}{2}\right)^2 + \left(\frac{D}{2}\right)^2 - F \quad (6)$$

The radius of the circle defined by the three points is thus given by eq (7):

$$R = \sqrt{\left(\left(\frac{C}{2}\right)^2 + \left(\frac{D}{2}\right)^2 - F\right)} \quad (7)$$

4C. Calculation of Radius of Curvature from V and Δθ

Figure 5B:
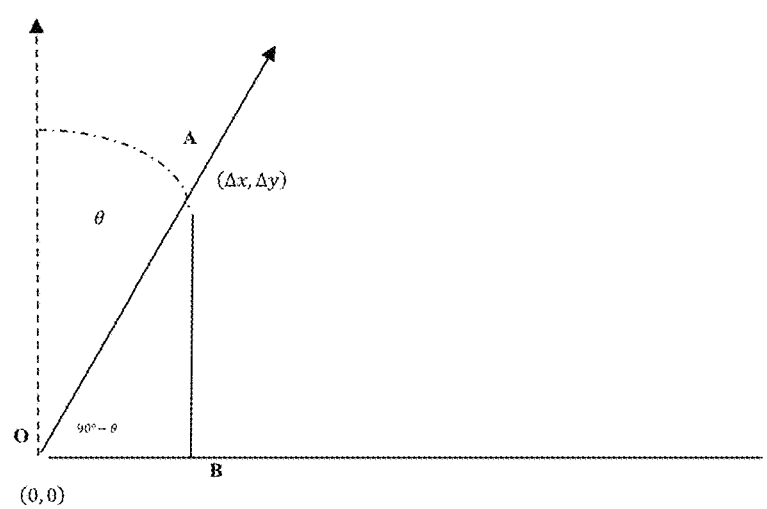
FIGS. 5A and 5B illustrate schematically a method of calculating the radius R of a curve from the linear velocity and $\Delta\theta$.
Figure 5A:
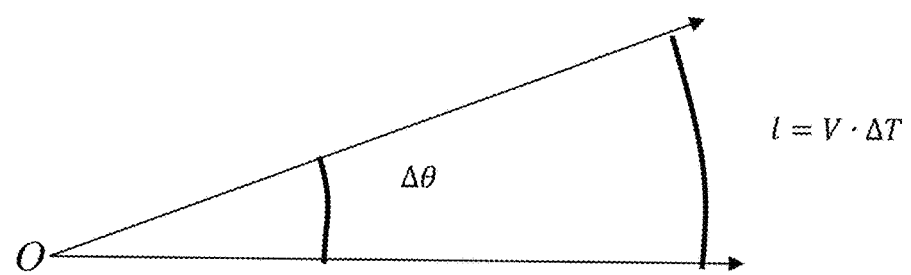

In the case in which the angular velocity is determined by a sensor such as a rate gyro, the sensor output directly provides information related to the angular velocity. In this case, the radius of curvature can be calculated from the linear velocity V and the angular motion (motion through an angle Δθ over time interval ΔT). Reference is now made to FIGS. 5A and 5B, which present schematic diagrams of this case.

If during time interval ΔT, a vehicle travels over an arc of radius R centered at point O with a linear velocity V, then the arc and the central angle Δθ are related by eq (8):

$$\Delta\theta \cdot R = V \cdot \Delta T \qquad (8)$$

Rearranging eq (8) yields eq (9):

$$R = \frac{V \cdot \Delta T}{\Delta\theta} \qquad (9)$$

Thus, given the linear velocity V as determined from a sensor such as the vehicle's speedometer and the angle Δθ determined from a sensor such as a rate gyro (see FIG. 2), the radius of curvature of the motion of the vehicle can be determined from eq (9).

As a specific non-limiting example of the use of eq (9), given a vehicle traveling at 90 km/h (=25 m/s) through an angle of $$\Delta\theta = 1°\left(= \frac{\pi}{180} \text{ radians}\right)$$

over a period of 0.1 s (i.e. a sampling rate of 10 Hz), the radius of curvature can be determined by insertion of these values into eq (9), as shown in eq (10):

$$R = \frac{V \cdot \Delta T}{\Delta\theta} = \frac{25 \cdot 0.1}{\left(\frac{\pi}{180}\right)} = 143 \text{ m} \qquad (10)$$

4C. Calculation of the Radius of a Bend Between Two Line Segments

A non-limiting example of how the radius of a bend or turn between two line segments formed from three points that are distant from one another, i.e. the rate at which the points are traversed by the vehicle is slow relative to the rate at which samples are obtained, is now given.

Figure 6:
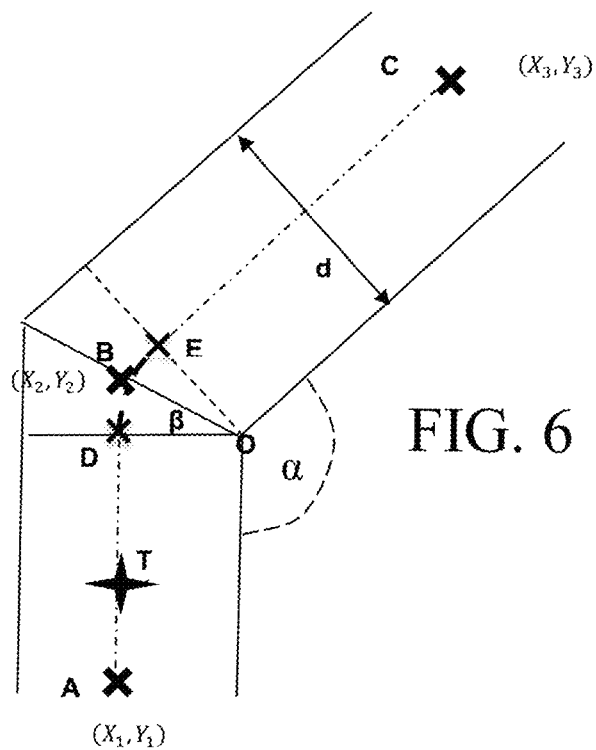
FIG. 6 illustrates a bend traversed by a vehicle between two straight line segments.

The calculation that follows is based on the following three assumptions. First, it is assumed that the path that is formed by the two segments represents a path of the vehicle through the center of a lane of width d. Second, it is assumed that the path of travel passes the first point in a straight line and curves along the arc of a circle (e.g. the second point lies on the bisector of the angle subtended by the arc defined by the curved part of the path), and after bending through the second point, continues in a straight line to the third point. Finally, it is assumed that the turn takes the vehicle in a circular arc from the center of the lane traveled in the first segment to the center of the lane traveled in the second segment. Reference is now made to FIG. 6, which illustrates schematically the path taken by the vehicle and the symbols used in the following derivation.

Given three points A, B, and C that define a portion of the path on the map (the polyline), having coordinates $(x_1, y_1)$, $(x_2, y_2)$, and $(x_3, y_3)$, respectively. Assuming that points D and E lie along the path of travel and in the centers of their respective lanes, then the tangent of the angle between the two segments (α) will be as given in eq (12), where $m_1$ and $m_2$ are as defined in eq (11).

$$m_1 = \frac{y_2 - y_1}{x_2 - x_1}; m_2 = \frac{y_3 - y_2}{x_3 - x_2} \qquad (11)$$

$$\tan\alpha = \left|\frac{m_2 - m_1}{1 + m_1 \cdot m_2}\right| \qquad (12)$$

The radius of arc DE is d/2, and the center of the arc is defined as point O. Given these definitions, then the tangent of angle β (∠BOD), where $$\left(\beta = \frac{180° - \alpha}{2}\right),$$

is given by eq (13) from which |BD| can be found as given in eq (14).

$$\tan\beta = \frac{|BD|}{|DO|} = \frac{|BD|}{d/2} \qquad (13)$$

$$|BD| = \frac{d}{2} \cdot \tan\beta \qquad (14)$$

That is, the radius of curvature at time t is either infinite (the vehicle is traveling in a straight line) or is equal to d/2 (the path of the vehicle bends).

Given $P_2 = B(x_2, y_2)$ and $P_t$ is any point that lies on the polyline, then the distance between $P_2$ and $$P_t(D(P_2, P_t)) = \sqrt[2]{(X_2 - X_T)^2 + (Y_2 - Y_T)^2}$$

and the radius of curvature $R_t$ is given by eqs (15) and (16) (where a is the angle between the two roads)

$$R_t = \frac{d}{2} \text{ when } D(P_2, P_t) < \frac{d}{2} \cdot \tan\beta\left(= \frac{d}{2} \cdot \tan\left(\frac{180° - \alpha}{2}\right)\right) \qquad (15)$$

$$\text{otherwise } R_t = \infty \qquad (16)$$

That is, if the distance between $P_2$ and $P_t$ is greater than or equal to the critical value given in eq (15), then the radius of curvature is infinite, i.e. the vehicle is traveling in a straight line, while if the distance between $P_2$ and $P_t$ is less than this critical value, the radius of curvature is equal to d/2.

4D. Production of the Curvature Signal Based on Map Altitude Information

The planar curvature signal is based on the (x,y) map coordinates and is analogous to the yaw signal received from the gyro and magnetometer. The information from this layer is effective for correction of sensor errors near turns in a plane, but is not effective for travel in a relatively straight line. As was described above, in cases in which the vehicle travels at constant speed in a straight line, sensor drift can cause significant loss of accuracy in ~30 s. In some embodiments of the invention, in the exceptional case of travel without acceleration (either change of velocity or change of direction) for more than 30 s, the calculation of the vehicle's location can be corrected by reference to an independent positioning system such as a GPS or INS. Even in this exceptional circumstance, however, the method disclosed herein provides high positional accuracy without any need for continuous reference to another positioning system. In this section, a method for correcting sensor drift without reference to a second positioning system is described.

Figure 7A:
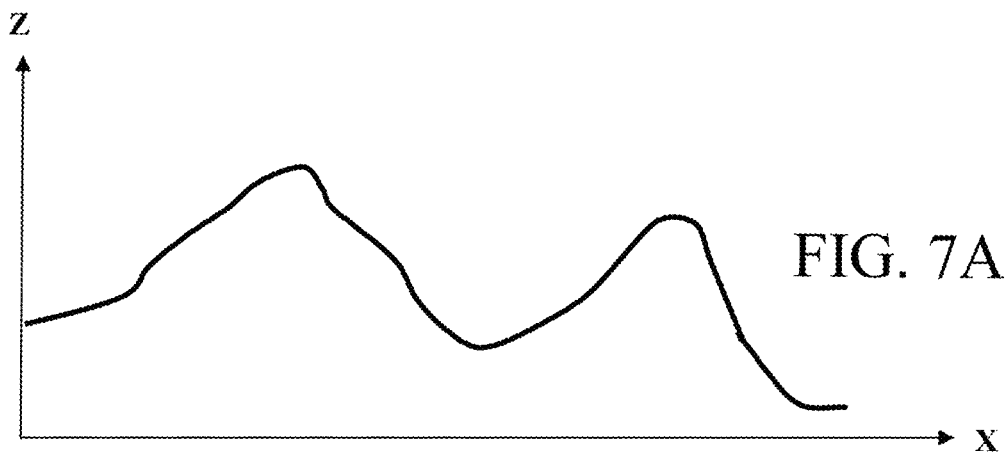
FIGS. 7A and 7B illustrate a travel path that includes motion along the z-axis (FIG. 6A) and definitions of x- and z-coordinates (FIG. 6B); and, FIGS. 8A and 8B illustrate schematically how the position and direction of travel are determined from signals obtained from a magnetometer, FIG. 7A illustrating the symbols used to define the position of the magnetometer relative to the earth and FIG. 7B illustrating graphically how the calculation is performed.
Figure 7B:
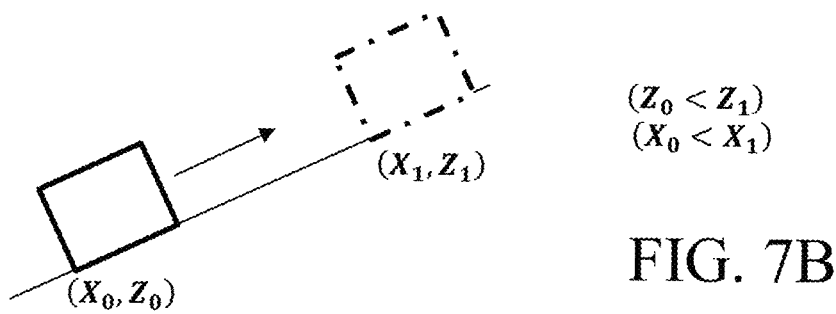
Figure 8A:
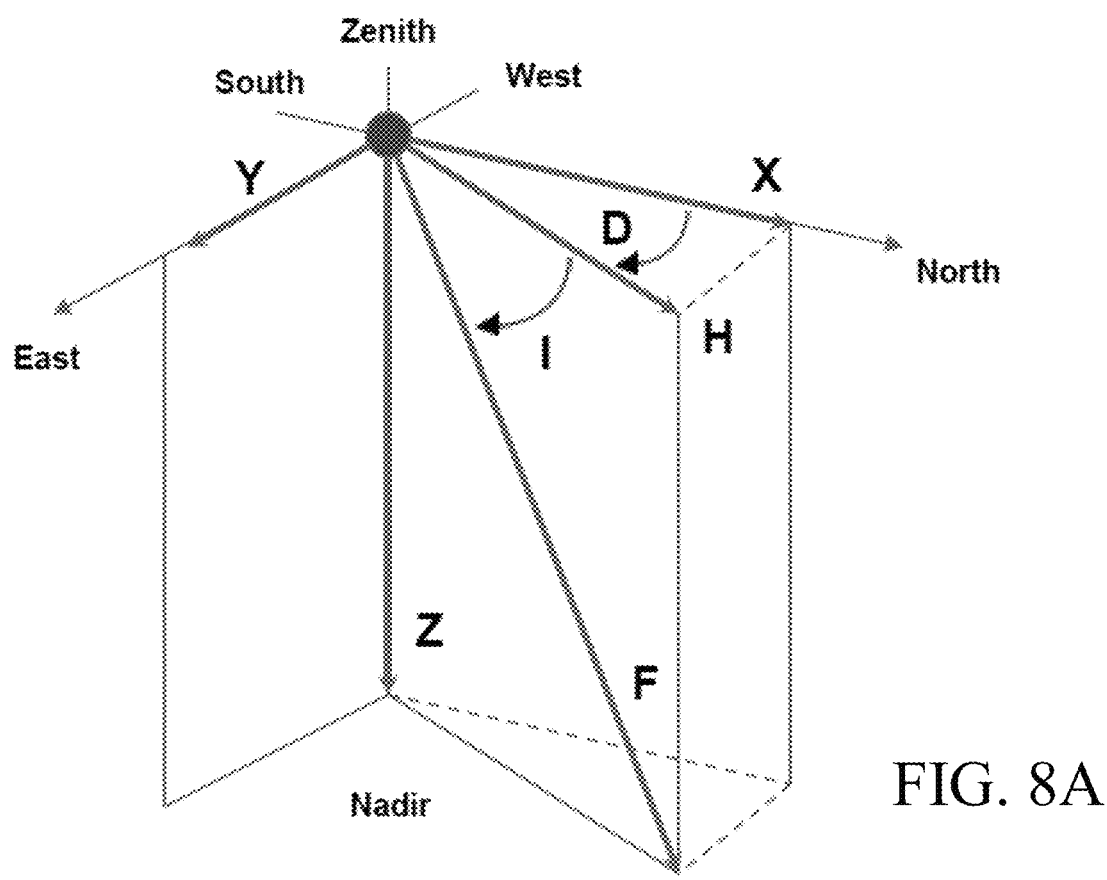
Figure 8B:
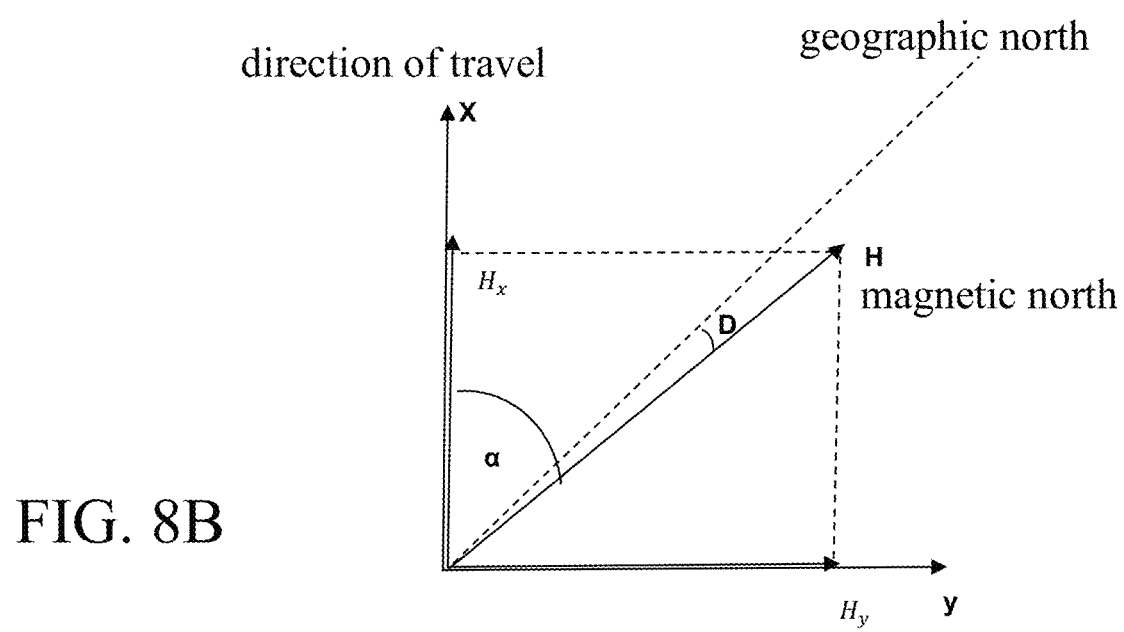

Movement along the z-axis on a straight road can provide additional information about the position of the instrument in the direction of travel. The altitude curvature signal is based on the (x,z) map coordinates. As explained above, each set of three points that form a sample produces a scalar value such as a radius of curvature. Similarly, the angular motion sensor (e.g. a gyro) produces a sequence of scalar values (pitch and yaw). The two sequences of scalar values are then equated via the correlation between them, e.g. by minimizing the differences between them via a least-squares analysis. In some embodiments of the invention, altitude data is provided by the addition of data obtained from an altimeter (barometric data) and accelerometer. Reference is now made to FIG. 7, which gives an example of a travel path that includes motion along the z-axis (FIG. 7A) and definitions of x- and z-coordinates (FIG. 7B).

The z-axis is defined as the altitude of the road at any particular point, while the x-axis is defined as the direction of motion of the vehicle. Similarly to the planar curvature signal, in the three-dimensional case, the curvature signal from the map is calculated from three points along the road in the xz plane. This signal provides the degree of curvature of the height relative to the earth. The curvature signal is calculated from every three successive points obtained from the velocity sensors and is correlated with the curvature signal R from the map. Four independent comparisons/correlations are performed. The "yaw" signal from the angular motion sensor is compared with the data relating to the map xy plane; the "pitch" signal from the angular motion sensor is compared with the data relating to the map xz plane; the magnetometer signal is compared to the data relating to the map xy plane; and the barometer signal is compared to the map xz plane.

The best correlation between two signals provides the position of the vehicle on the map.

4E. Interpolation from a Polynomial of Degree N

As discussed above, in some embodiments of the invention, rather than calculation of a radius of curvature from three successive points along the travel of the vehicle, polynomial interpolation of the curvature signal is performed. N points from the path traveled by the vehicle are obtained (N>2) and the pathway defined thereby is expressed as a polynomial of degree N−1.

In order to find the N+1 coefficients of the polynomial of degree N, it necessary to obtain N+1 independent equations, eq (17):

$$y = A_0 + A_1 X + A_2 X^2 \ldots A_N X^N = \Sigma_0^N (A, X^N) \quad (17)$$

The coefficients can be obtained from the N+1 latest points on the path of travel of the vehicle, whereby a system of N+1 linear equations is obtained, eq (18):

$$A = \begin{pmatrix} A_{00} & \ldots & A_{0N} \\ \vdots & \ddots & \vdots \\ A_{N0} & \ldots & A_{NN} \end{pmatrix} \quad (18)$$

This system of equations can be solved by methods analogous to those given above for finding the center of a circle given three points, eqs (4)-(7). The polynomial thus obtained will yield a curve that approximates the path traveled between the N+1 points. A correlation is then performed between the pathway obtained from the velocity sensors and the polynomial that approximates the polynomial obtained from the map by comparison of the slopes of the tangents between the two paths.

4F. Production of the Curvature Signal in the Plane of Travel by Use of a Magnetometer—$M_{xy}$ (Correction of Magnetometer Measurements Due to Deviations in Magnetic North)

Magnetic north deviates from geographic (true) north and varies with location on the globe and with time. A complete global map of the earth's magnetic field and a calculational model to eliminate deviations in the horizon are known in the art.

The magnetometer provides a three-dimensional signal of the magnetic flux. The angular velocity of the vehicle is calculated according to the following method. Reference is now made to FIG. 7A, which illustrates schematically the position of the magnetometer with reference to the earth, and to FIG. 7B, which illustrates graphically how the correction of the deviation of magnetic north from geographic north is performed.

As shown in FIG. 7B, the x-axis is taken as the direction of travel, and $H_x$ and $H_y$ are the strengths of the x- and y-components of the magnetic field measured by the magnetometer. D is the deviation between magnetic north as measured at a particular point and true geographic north. In order to find the angle θ of travel relative to true geographic north, first the angle α is determined from eq (19):

$$\alpha = \arctan\left(\frac{H_y}{H_x}\right) \quad (19)$$

θ is then calculated as α±D. In general, D is treated as a given, and can be treated as a constant over a particular area over which the vehicle travels, as D will generally vary much more slowly than α.

In preferred embodiments of the I-sticker, the MCU is programmed to determine the position of the vehicle according to the method given above.

The method can also be programmed in other devices. As a non-limiting example, the method can be downloaded to a mobile device (e.g. a mobile telephone) as an application that incorporates a program for performing the method and for downloading relevant information (e.g. map layers) from a remote location such a server or the cloud. The application can then be used for determining the location of the mobile device without any necessity for continuous activation of the mobile device's positioning system (GPS). When the method described herein is used to determine the position of the mobile device, it can be used in place of the mobile device's internal location system in other navigation programs such as the commercially available WAZE and GOOGLE MAPS. Thus, use of the method disclosed herein as an application for a mobile device will save on power use and thereby extend the life of the mobile device's battery.

We claim:

1. A method for calculating the position and direction of a moving vehicle, said method comprising:
   determining said vehicle's position at time $t_0$;
   determining said vehicle's linear velocity at time $t > t_0$ from output of a linear velocity sensor in physical contact with, and at a known orientation relative to, said vehicle;

determining said vehicle's angular velocity at said time t from output of an angular velocity sensor in physical contact with, and at a known orientation relative to, said vehicle;

calculating from said linear velocity and said angular velocity a calculated arc A along which said vehicle is moving, said calculated arc A characterized by a calculated radius R;

obtaining a map layer;

extracting from said map layer an estimated arc A' along which said vehicle is moving, said estimate arc A' characterized by an estimated radius R'; and obtaining at least one correlation selected from the group consisting of:
- a correlation between said calculated arc A and said estimated arc A'; and
- a correlation between said calculated radius R and said estimated radius R';

thereby obtaining said vehicle's position and direction; wherein:

said step of obtaining at least one correlation comprises:
scanning N samples of curvature of said vehicle's path ($R_i$), N >1, from said sensors;
scanning N samples of curvature of said vehicle's path ($R'_i$) from said map; and
finding a closest match between said samples $R_1$ and said samples $R'_i$, from said sensors and said samples from said map;

and further wherein:

said step of scanning N samples of curvature of said vehicle's path ($R'_i$) from said map comprises:
obtaining three points from said map that lie on a polyline constructed from travel of said vehicle, said three points comprising two outer points (1100, 1110) and an inner point (1120);
in a case in which neighboring points on said map are characterized by a separation equal to or smaller than a distance between successive points obtained from scanning by said sensors, calculating a curvature signal for travel in an xy plane as a radius of a circle defined by said three points; and
in a case in which neighboring points on said map are characterized by a separation larger than said distance between successive points obtained from scanning by said sensors, calculating a curvature signal for travel in an xy plane as a radius of curvature of a turn about said inner point (1120) along points on the map that are consistent with a path reported by said sensors.

2. The method according to claim 1, wherein said method does not make use, at any time subsequent to $t_0$, of any data obtained either from a guidance system not in physical contact with said vehicle or from an inertial guidance system.

3. The method according to claim 1, wherein said method does not make use of any step comprising Kalman filtering.

4. The method according to claim 1, wherein said axial velocity sensor is selected from the group consisting of said vehicle's speedometer and said vehicle's accelerometer.

5. The method according to claim 1, wherein said angular velocity sensor comprises at least one sensor selected from the group consisting of rate gyros and magnetometers.

6. The method according to claim 1, wherein each sample $R_i$, comprises three location points.

7. The method according to claim 1, wherein said step of scanning N samples of curvature of said vehicle's path ($R_i$), N >1, from said sensors comprises scanning by said sensors at a rate of 300 Hz.

8. The method according to claim 1, wherein said step of scanning N samples of curvature of said vehicle's path ($R_i$), N >1, by said sensors comprises scanning said sensors at a rate sufficient to provide a distance resolution along said vehicle's path of at least 10 Cm.

9. The method according to claim 1, wherein said step of finding a closest match comprises finding a closest match by performing a least-squares analysis of differences between $R_i$ and $R'_i$, for each value of i.

10. The method according to claim 1, comprising:
Kalman filtering said results of said step of obtaining a correlation between said arc A and said arc A'; and
feeding back results of said step of Kalman filtering to said angular velocity sensor.

11. The method according to claim 1, comprising downloading and storing map information for use in said calculations.

12. The method according to claim 1, wherein said vehicle travels along a path characterized on said map by a first road and a second road meeting with an angle α therebetween, a point O on a vertex of said angle, a point D in a center of a lane in which said vehicle is traveling prior to said meeting of said two roads, a point B along a polyline passing through said meeting of said two roads, and angle β=∠BOD; wherein said step of scanning N samples of curvature of said vehicle's path ($R'_i$) from said map comprises calculating a radius of curvature $R_t$ through said travel from said first road to said second road as $$R_t = \frac{d}{2}$$

when $$D(P_2, P_t) < \frac{d}{2} \cdot \tan\beta\left( = \frac{d}{2} \cdot \tan\left(\frac{180° - \alpha}{2}\right)\right),$$

otherwise $R_t = \infty$.

13. The method according to claim 1, wherein said step of obtaining a correlation between said arc A and said arc A' comprises determining each of said arcs A and A' from a polynomial fit to at least 3 points along each of said arcs.

14. The method according to claim 1, comprising producing a curvature signal based on map altitude information.

15. The method according to claim 14, wherein said step of comprising producing a curvature signal based on map altitude information comprises:
comparing a yaw signal from said angular motion sensor to data relating to an xy plane of said map;
comparing a pitch signal from said angular motion sensor to data relating to an xz plane of said map;
comparing a magnetometer signal to data relating to an xy plane of said map;
comparing an altimeter signal to data relating to an xz plane of said map;
correlating each pair of signals; and
producing a curvature signal based on the best correlation obtained.

16. The method according to claim 1, comprising producing a curvature signal in a plane of travel by using a magnetometer at a point at which earth's magnetic field deviates from true (geographic north) by an angle D.

17. The method according to claim 1, further comprising:
obtaining a self-contained integrated portable vehicle tracking system contained within a single container unit, said vehicle tracking system comprising:
a microcontroller unit (MCU) (108), comprising memory, a cryptographic engine, and a processor;
a wireless transceiver (110) in communication with said MCU;
a power source (113);
a power management system configured to control said power source; and
optionally, an identification lanyard (107) connected to said MCU;
said MCU being programmed to calculate a position of a vehicle according to said method;
attaching said self-contained integrated portable vehicle tracking system to a vehicle; and
using said MCU to perform said method, thereby determining said position of said vehicle.

18. The method according to claim 16, wherein said step of producing a curvature signal comprises:
measuring x and y components of earth's magnetic field, $H_x$, and $H_y$, respectively;
calculating an angle $$\alpha = \arctan\left(\frac{H_y}{H_x}\right);$$

and
calculating $\theta = \alpha \pm D$, wherein $\theta$ is an angle of travel relative to true north.

19. A self-contained integrated portable vehicle tracking system, comprising:
a microcontroller unit (MCU) (108), comprising memory, a cryptographic engine, and a processor;
a wireless transceiver (110) in communication with said MCU;
a power source (113);
a power management system configured to control said power source; and
an identification lanyard (107) connected to said MCU; wherein:
said vehicle tracking system is contained within a single container unit;
information uniquely identifying at least one of said vehicle and said self-contained integrated portable vehicle tracking system is stored within said identification lanyard; and
said MCU is programmed to calculate a position of a vehicle with which said system is traveling according to a method comprising:
determining said vehicle's position at time $t_0$;
determining said vehicle's linear velocity at time $t \leq t_0$ from output of a linear velocity sensor in physical contact with, and at a known orientation relative to, said vehicle;
determining said vehicle's angular velocity at said time t from output of an angular velocity sensor in physical contact with, and at a known orientation relative to, said vehicle;
calculating from said linear velocity and said angular velocity a calculated arc A along which said vehicle is moving, said calculated arc A characterized by a calculated radius R;

obtaining a map layer;
extracting from said map layer an estimated arc A' along which said vehicle is moving, said estimate arc A' characterized by an estimated radius R'; and
obtaining at least one correlation selected from the group consisting of:
a correlation between said calculated arc A and said estimated arc A'; and
a correlation between said calculated radius R and said estimated radius R';
thereby obtaining said vehicle's position and direction.

20. The self-contained integrated portable vehicle tracking system according to claim 19, wherein said vehicle tracking system does not comprise any wired connection to any device or location external to said container unit.

21. The self-contained integrated portable vehicle tracking system according to claim 19, wherein said container unit is configured to be attached to a window of a vehicle.

22. The self-contained integrated portable vehicle tracking system according to claim 19, comprising:
a GPS receiver (109) in communication with said MCU; and
a GPS patch antenna (104) connected to said MCU via a serial bus and to said GPS receiver.

23. The self-contained integrated portable vehicle tracking system according to claim 19, wherein one side said of said container unit comprises attachment means for attaching said container unit to a portion of a vehicle, and said container unit is configured such that said connection between said identification lanyard and said MCU passes through or over said attachment means.

24. The self-contained integrated portable vehicle tracking system according to claim 19, wherein said power source (113) comprises a solar cell.

25. The self-contained integrated portable vehicle tracking system according to claim 19, wherein said power source comprises a rechargeable battery connected to said power management system, and further wherein said power management system comprises at least one regulator, a battery charger, switching transistors, and integrated circuits configured to charge said rechargeable battery when energy balance conditions allow it and to discharge said rechargeable battery when said solar cell does not provide sufficient energy to run said portable vehicle tracking system.

26. The self-contained integrated portable vehicle tracking system according to claim 19, comprising a three-axis accelerometer in communication with said MCU and connected to said power management system.

27. The self-contained integrated portable vehicle tracking system according to claim 19, comprising a rate gyro in communication with said MCU and connected to said power management system.

28. The self-contained integrated portable vehicle tracking system according to claim 19, comprising a three-axis magnetometer in communication with said MCU and connected to said power management system.

29. The self-contained integrated portable vehicle tracking system according to claim 19, comprising a tilt sensor in communication with said MCU and connected to said power management system.

30. The self-contained integrated portable vehicle tracking system according to claim 19, wherein all communication connections between system components and all communication between system components and locations external to said container unit are configured such that said communication is secure.

31. The self-contained integrated portable vehicle tracking system according to claim 19, comprising transmitting means for transmitting a number associated to a mobile device and means for transmitting an acknowledgment from said mobile device to said computer located at cloud.

32. The self-contained integrated portable vehicle tracking system according to claim 19, comprising a CANBUS in communication with at least one component of a system of said vehicle selected from the group consisting of said vehicle's power system; said vehicle's camera system; said vehicle's radar system; said vehicle's wheel tracker; said vehicle's computer system; said vehicle's on-board diagnostics; and said vehicle's navigation system.

33. The self-contained integrated portable vehicle tracking system according to claim 19, wherein a map layer is stored in said memory.

\* \* \* \* \*